United States Patent
Müller et al.

(10) Patent No.: US 6,172,126 B1
(45) Date of Patent: Jan. 9, 2001

(54) COSOLVENT-FREE, AQUEOUS, ANIONIC POLYURETHANE DISPERSIONS AND THEIR USE AS PEELABLE COATINGS

(75) Inventors: Hanns-Peter Müller, Odenthal; Horst Gruttmann, Leverkusen, both of (DE); Holger Casselmann, Mcmurray, PA (US); Heino Müller, Leverkusen (DE); Joachim Petzoldt, Monheim (DE); Manfred Bock, Leverkusen (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/339,458

(22) Filed: Jun. 24, 1999

Related U.S. Application Data

(62) Division of application No. 08/989,065, filed on Dec. 11, 1997, now Pat. No. 5,965,195.

(30) Foreign Application Priority Data

Dec. 20, 1996 (DE) .............................. 196 53 585

(51) Int. Cl.$^7$ ..................................... C08J 11/04
(52) U.S. Cl. ........................... 521/49; 521/40; 521/40.5; 521/49.5
(58) Field of Search ............................. 521/40, 40.5, 49, 521/49.5; 427/155, 156, 388, 591, 840; 528/71, 49, 65

(56) References Cited

U.S. PATENT DOCUMENTS

| | | | |
|---|---|---|---|
| 3,412,054 | 11/1968 | Milligan et al. | 260/18 |
| 4,139,674 | 2/1979 | Muller et al. | 428/339 |
| 4,764,533 | 8/1988 | Mosbash et al. | 524/591 |
| 5,025,064 | 6/1991 | Reiff et al. | 524/591 |
| 5,141,987 | 8/1992 | Nachtkamp et al. | 524/591 |
| 5,294,665 * | 3/1994 | Pedain et al. | 524/591 |
| 5,298,128 * | 3/1994 | Hausdorf et al. | 203/47 |
| 5,330,788 | 7/1994 | Roberts | 427/154 |
| 5,422,186 | 6/1995 | Biggeleben et al. | 428/423.3 |
| 5,569,707 | 10/1996 | Blum et al. | 524/591 |
| 5,616,623 * | 4/1997 | Munzmay et al. | 521/49.5 |
| 5,658,617 | 8/1997 | Göbel et al. | 427/372.2 |

FOREIGN PATENT DOCUMENTS

| | | |
|---|---|---|
| 4343895 | 6/1995 | (DE) . |
| 735069 | 10/1996 | (EP) . |
| 5171068 | 7/1993 | (JP) . |

* cited by examiner

Primary Examiner—Edward J. Cain
Assistant Examiner—Katarzyna Wyrozebski-Lee
(74) Attorney, Agent, or Firm—Joseph C. Gil; Thomas W. Roy

(57) ABSTRACT

The present invention relates to coating composition, which is suitable for preparing light fast coatings and contains a cosolvent-free, aqueous, anionic dispersion of polyurethane-ureas, the solids content of which contains the reaction product, present at least partially in salt form, of a) an NCO prepolymer prepared from
  i) an aliphatic and/or cycloaliphatic diisocyanate,
  ii) a macrodiol having a number average molecular weight of 500 to 10,000
  iii) a 2,2-bis-(hydroxymethyl)alkane monocarboxylic acid and
  iv) a diol having a molecular weight of 62 to 400, with
b) optionally a diamine,
c) a monofunctional chain terminating agent,
d) water and
e) a neutralizing agent, provided that the NCO content of the prepolymer is up to 25% lower than the theoretical value, the entire polyurethane-urea synthesis reaction is performed in the homogeneous phase and no cosolvent having a boiling range of greater than 100° C. is used during the preparation of the dispersion of polyurethane-ureas.

The present invention also relates to light fast coatings prepared from these coating compositions and to a process for preparing these coating compositions. Finally, the present invention relates to peelable coatings and to a method for recycling these coatings.

5 Claims, No Drawings

COSOLVENT-FREE, AQUEOUS, ANIONIC POLYURETHANE DISPERSIONS AND THEIR USE AS PEELABLE COATINGS

This is a divisional of U.S. Ser. No. 08/989,065, filed Dec. 11, 1997 U.S. Pat. No. 5,956,195.

BACKGROUND OF THE INVENTION

Field of the Invention

The present invention relates to novel cosolvent-free, aqueous, anionic poly-urethane dispersions, to a process for their production and to their use as a lacquer, coating, adhesive or binder for any desired substrates, in particular as peelable lacquers.

Description of the Prior Art

Polyurethane plastics dispersed in water are known and have been described, e.g., in *Angewandte Makromoleculare Chemie*, 98 (1981) 133–165). Polyurethane binders in aqueous lacquers have been disclosed in Wasserlacke, 1992, ISBN 3-8249-0100-5, page 46).

Because of their superior properties, such as flexibility, abrasion resistance, tear strength, as well as hardness and toughness, these polyurethane plastics may be used in a wide range of applications in the lacquers, coatings, adhesives and binders sectors.

Prior art aqueous polyurethane dispersions have made a major contribution to the stringent requirements to reduce emissions of volatile organic compounds (VOC's). However, prior art aqueous anionic polyurethane dispersions do generally still contain high-boiling, polar organic solvents such as dimethylformamide, N-methylpyrrolidone, etc. The addition of these high-boiling components simplifies the production process. Once the anionic polyurethane plastics have been converted into the aqueous phase, the high-boiling components remain in the dispersions. This is desirable when these dispersions are used as lacquers, coatings or adhesives, because the organic, polar compounds act as plasticizers, leveling agents and/or coalescing agents and widen the range of applications for the dispersions.

Disadvantageously, these high-boiling components evaporate from the layers over the period of use as a lacquer, coating or adhesive and the organic, polar high-boiling components reduce the water resistance of the lacquer, coating and adhesive layers.

When the dispersions containing cosolvents are used as a peelable coating for the temporary protection of coated surfaces, organic, polar, high-boiling solvents are undesirable because they damage the coated surfaces. These high-boiling components are also undesirable for when the coatings are applied to plastics.

Peelable coatings for the temporary protection of, for example, motor vehicles, are known. Japanese application JP 05 171 068 describes peelable coatings consisting of polybutyral resins, plasticizers, lecithin, organic solvents, non-sublimable hindered phenols, anti-settling agents and UV absorbers. U.S. Pat. No. 5,330,788 describes an aqueous coating composition which contains a film-forming acrylate polymer and surface-active compounds.

The coating composition contains alkanolamines and "surfactants," i.e., surface-active substances. An anionic phosphate ester is added as the "surfactant." An aqueous concentrate of alkanolamines, surface-active compounds and chelating agents is used as the stripping agent. No information is given with regard to the fate of the stripped coating waste. An automotive coating method to protect the vehicle against stone chipping is also described. The coating used in this method is a polyurethane coating described in no further detail dissolved in isopropanol, toluene, ethyl acetate mixtures. Once damaged, the lacquer may be stripped and the automotive component then recoated with the coating solution.

The previously described processes for the temporary protection of coated or uncoated articles are associated with serious disadvantages. On the one hand, organic solvents are used for the lacquer resins, which can have a detrimental effect on the coated surfaces. On the other hand, stripping agents are used, some of which contain strongly basic compounds. No information is given with regard to the fate of the stripped lacquers.

Recyclable peelable coatings are previously unknown. Reference may here be made, for example, to the automotive industry's demands for aqueous peelable coatings to protect the exterior of motor vehicles. Wax-based exterior protection agents are no longer acceptable in various countries on environmental protection grounds.

The performance currently required from peelable coatings is that the coating should be water-based and cosolvent-free. The coating solution or dispersion should be capable of being applied by dipping, knife coating, pouring, brushing and spraying (airless and electrostatic).

Subsequent drying at 20 to 80° C. should yield a homogeneous film. The film should be water resistant, transparent, tear-resistant, UV-resistant, temperature-resistant, resistant to precipitation (of an organic or inorganic nature), and should adhere to the substrates and be readily removable by peeling. The coating should be reusable by means of a suitable process.

Previously known methods, processes and coatings do not fulfill all of these requirements. It must thus be considered surprising that the aqueous polyurethanepolyurea dispersions according to the invention fullfil all of these requirements, especially since it is known that polyurethane coatings are particularly suitable for the production of coatings and multi-layer coatings having good adhesion properties as disclosed, for example, in EP-A 634,431. The thermoplastic polyurethanes having lateral carboxyl groups described in U.S. Pat. No. 4,139,674 adhere so strongly to glass that they are ideally suited to the production of glass laminates.

It is thus particularly surprising and unexpected that the polyuretlhane-ureas according to the invention do not exhibit this characteristic, provided that certain drying conditions are maintained.

It has not been disclosed that the aqueous polyurethane dispersions described in *Angewandte Makromoleculare Chemie*, 98 (1981) 133–165 are peelable coatings. EP-A 669,352, EP-A 407,798, EP-A 427,979 and EP-A 269,972 are among the closest prior art. EP-A 269,972 describes polyurethanes, which are soluble or dispersible in water and contain 0.5 to 30 wt. % of ethylene oxide units present in polyether chains arranged terminally or laterally and 0.1 to 120 milliequivalents of carboxylate groups per 100 g of solids. The products of the process are suitable for coating textiles, leather, paper, etc. They are not suitable for peelable coatings because they adhere too strongly to the substrates and swell when exposed to water. This is a disadvantage common to all polyurethane dispersions containing hydrophilic polyether chains in the solids. U.S. Pat. No. 3,412,054 describes polyurethane dispersions having limited dilutability in water and which require the presence of a cosolvent.

The products described in EP-A 427,979 have very good coating properties, such as adhesion and weathering resistance, but due to their content of hydrophilic monofunctional polyether chains are unsuitable for use as a peelable coating.

EP-A 407,798 describes a process for the production of aqueous dispersions of polyurethanes and their use as coating compositions for any desired substrates. Trialkylammonium compounds are used in this process in order to prevent the isocyanate groups and ammonia from reacting. The process is elaborate and, in addition to unsubstituted ammonium ions, the products also contain trialkylammonium counterions.

DE-A 4,343,895 describes a process for the production of polyurethane dispersions by reacting prepolymers containing unneutralized carboxyl groups and/or terminal NCO groups with ammonia and subsequently dispersing them in water. Ammonia is used in chemically bound form as ammonium carbonate. It is disclosed in the examples that N-methylpyrrolidone is used as a cosolvent. The products are used for the production of coatings, which are preferably crosslinked with melamine resins, for solid surfaces. These products are unusable as a peelable coating, due to the presence of NMP as the cosolvent and because they do not form peelable films without crosslinking agents.

EP-A 669,352 describes "soft-feel" coatings having good mechanical film properties and adhesion. It is disclosed in the examples that the products of the process have a content of organic solvents, in particular NMP, of approx. 2 to 3%. Aqueous polyurethane resins containing solvent are unsuitable as peelable coatings because they attack the coating layers they are intended to protect.

Cosolvent-free, aqueous dispersions of polyurethane-ureas having lateral carboxyl groups, which are at least partially neutralized by ammonia, containing no other hydrophilic groups and coating sheets peeled therefrom or can be recycled to aqueous dispersions have not previously been described.

An object of the present invention is to provide anionic polyurethane plastics, which may be used to provide coatings and adhesives which fulfil requirements with regard to mechanical properties, weathering resistance, light fastness, transparency, temperature resistance, tear strength, elongation, water resistance and resistance to precipitation (of an organic or inorganic nature) and recyclability.

It has now surprisingly been found that the type of salt groups bound to the polymer and the average particle size of the dispersed polymer particles are significant for the formation of defect-free layers. The process according to the invention allows the person skilled in the art, by means of these parameters, to reproducibly obtain stable anionic, cosolvent-free polyurethane dispersions and to produce defect-free coatings therefrom, especially on industrial coating lines.

SUMMARY OF THE INVENTION

The present invention relates to a coating composition, which is suitable for preparing light fast coatings and contains a cosolvent-free, aqueous, anionic dispersion of polyurethane-ureas, the solids content of which contains the reaction product, present at least partially in salt form, of
  a) an NCO prepolymer prepared from
    i) 20 to 60 wt. % of an aliphatic and/or cycloaliphatic diisocyanate,
    ii) 20 to 80 wt. % of a macrodiol having a number average molecular weight of 500 to 10,000 and mixtures thereof,
    iii) 2 to 12 wt. % of a 2,2-bis-(hydroxymethyl)alkane monocarboxylic acid, preferred 2,2-dimethylol propionic acid,
    iv) 0 to 15 wt. % of a diol having a molecular weight of 62 to 400,
    v) 0 to 10 wt. % of a monofunctional alcohol as a chain terminating agent having a molecular weight of 32 to 350, with
  b) 0 to 15 wt. % of a diamine having a molecular weight in the range from 60 to 300 as a chain extender,
  c) 0 to 10 wt. % of a chain terminating agent selected from the group comprising monoamines, alkanolamines and ammonia,
  d) 0 to 30 wt. % of water and
  e) 0.1 to 10 wt. % of a neutralizing agent,
the sum of the abovementioned percentages being 100%, provided that the NCO content of the prepolymer a) is 65 to 85%, preferably 75 to 80%, of the theoretical value.

The present invention also relates to light fast coatings prepared by applying the aqueous polyurethane-urea dispersions to any desired substrates and drying the coatings at a temperature of up to 150° C.

The present invention further relates to a process for the preparation of an anionic polyurethane dispersion comprising the steps of
  I) preparing an NCO prepolymer a), optionally in the presence of an inert solvent having a boiling range of 50 to 100° C., by reacting
    i) 20 to 60 wt. % of an aliphatic and/or cycloaliphatic diisocyanate,
    ii) 20 to 80 wt. % of a macrodiol having a number average molecular weight of 500 to 10,000 and mixtures thereof,
    iii) 2 to 12 wt. % of a 2,2-bis-(hydroxymethyl)alkane monocarboxylic acid, preferred 2,2-dimethyl propionic acid,
    iv) 0 to 15 wt. % of a diol having a molecular weight of 62 to 400,
    v) 0 to 10 wt. % of a monofunctional alcohol as a chain terminating agent having a molecular weight of 32 to 350 at a temperature of 50 to 150° C.,
  II) subsequently reacting the NCO groups of the prepolymer with
    b) 0 to 15 wt. % of a diamine having a molecular weight in the range from 60 to 300 as a chain extender,
    c) 0 to 10 wt. % of a chain terminating agent selected from the group comprising monoamines, alkanolamines and ammonia,
    d) 0 to 30 wt. % of water, based on the solids,
      wherein b), c) and d) are added together or in any desired sequence,
  III) adding 0.1 to 10 wt. % of neutralizing agents and additional water,
provided that the NCO content of the prepolymer a) is 65 to 85%, preferably 75 to 80%, of the theoretical value and after carrying out the reaction, the solvent, preferably acetone, is removed by distillation, optionally under reduced pressure.

DETAILED DESCRIPTION OF THE INVENTION

The aqueous dispersions according to the invention are applied as a recyclable peelable coating for the temporary protection of motor vehicles, steel and aluminum substrates, glass and plastic sheets and any other desired substrates by dipping, knife coating, pouring, spraying, brushing and subsequent drying at 20 to 100° C., preferably at 20 to 80° C.

These coatings are water-resistant, transparent, tear-resistant, UV-resistant, temperature-resistant and resistant to precipitation (of an organic or inorganic nature), and adhere well to the substrates, but may be readily removed by peeling.

The used, peeled coating layers according to the invention may also be reused by mechanically comminuting them after prior cleaning, dissolving them in acetone, water and neutralizing agent, preferably ammonia (optionally with heating), and removing the acetone by distillation, optionally under reduced pressure. The recovered peelable coating is obtained for reuse in the form of an aqueous dispersion.

Production processes for polyurethane-urea dispersions are known and described, for example, in D. Dieterich, *Angewandte Chemie* 82, 53 (1970)). Cosolvent-free dispersions are described, for example, in EP-A 735,069. The process described therein is restricted to the use of dimethylolbutyric acid. The entire description shows that it is not possible to use dimethylolpropionic acid in the process of EP-A 735,069. Dimethylolbutyric acid is not industrially available.

Using the described prior art processes, it is also not possible to produce polyurethane-urea dispersions which fulfil the requirements placed upon cosolvent-free, recyclable peelable coatings. Surprisingly, it has been possible to achieve these objectives by using known ingredients in certain quantities and, in particular, by using production process described hereinafter.

It has indeed surprisingly been found that excellent weather-resistant coatings are always obtained from the polyurethane-urea dispersion if, in the prepolymer stage, the NCO content established is not the theoretical content but instead a content of 65 to 85% of the theoretical content. This means that the polyurethane-ureas according to the invention are reproducibly obtained from the chain-extension reaction.

Aliphatic and/or cycloaliphatic diisocyanates are preferably used as component a-i). Examples include isophorone diisocyanate (IPDI), 4,4'-dicyclohexylmethane diisocyanate, 1-methyl-2,4-diisocyanato-cyclohexane and 1-methyl-2,6-diisocyana-to-cyclohexane in any desired mixing ratios, 1,6-hexamethylene diisocyanate and/or 1,3-cyclohexane diisocyanate. It is also possible to use small amounts of aromatic diisocyanates, such as 2,4- and 2,6-toluene diisocyanate or 2,4'- and 4,4'-diphenylmethane diisocyanate.

Macrodiols having a number average molecular weight of 500 to 10,000 are used as component a-ii). The macrodiols are preferably polyester diols obtained by reacting dicarboxylic acids with diols, optionally in the presence of known esterification catalysts, preferably by melt or azeotropic condensation at temperatures of 140–240° C.

Examples of suitable acids or anhydrides include adipic acid, succinic acid (anhydride), maleic acid (anhydride), sebacic acid, azelaic acids, the various commercially available dimeric fatty acids in saturated (hydrogenated) unsaturated form), phthalic acid (anhydride), isophthalic acid, tetrahydrophthalic acid (anhydride), 1,4-cyclohexanedicarboxylic acid, hexahydrophthalic acid (anhydride). Suitable diols include the commercially available diols, such as ethylene glycol, 1,2- and 1,3-propanediol, 1,3- and 1,4-butanediol, 1,6-hexanediol, diethylene glycol, dipropylene glycol, neopentyl glycol or mixtures of these diols. Preferred polyester diols consist of adipic acid, hexanediol and neopentyl glycol.

Polycarbonate diols, polycaprolactone diols, hydroxypolytetra-hydrofurans and hydroxypolyethers based on propylene oxide are also suitable.

Suitable polycarbonate diols are obtained, for example, by reacting carbonic acid derivatives, such as for example diphenyl carbonate or phosgene, with alcohols, preferably diols, of the stated type.

The number average molecular weight of these polyols, which may be determined by end group analysis, is 500 to 10,000, preferably 700 to 4000 and more preferably 1000 to 2500.

Preferred starting components a-iii) are selected from 2,2-bis-(hydroxymethyl)-alkane monocarboxylic acids having a total of 5 to 8 carbon atoms, which correspond to formula (I)

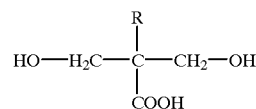

wherein
R represents an alkyl residue having 1 to 4 carbon atoms. 2,2-Dimethylolpropionic acid is particularly preferred.

Component a-iv) is selected from short-chain diols having a molecular weight of 62 to 400. Examples include those previously set forth for preparing the polyester diols. 1,4-butanediol is particularly preferred.

Component a-v) is selected from methanol, ethanol, butanol, hexanol, 2-ethyl-hexanol, octanol and dodecanol and any desired alcohols having a molecular weight of 32 to 350.

Any aliphatic and/or cycloaliphatic compounds having at least two isocyanatereactive amino groups may be used as component b). Examples include ethylenediamine, propylenediamine, hexamethylenediamine, isophoronediamine, p-xylylenediamine, 4,4'-diaminodicyclohexylmethane, and 4,4'-diamino-3,3-dimethyldi-cyclohexylmethane.

Component c) is selected from ammonia, monofunctional amines such as methyl-, ethyl-, n-propyl-, isopropylamine, cyclohexylamine, octylamine, diethylamine, dibutylamine, as well as aminoalcohols such as ethanolamine, diethanolamine and propanolamine.

Neutralizing agents e) are selected from ammonia, N-methylmorpholine, dimethylsiopropanolamine, triethylamine, dimethylethanol amine, methyldiethanolamine, triethanolamine, morpholine, tripropylamine ethanolamine, diethanolamine, triisopropanolamine and mixtures thereof.

In a preferred embodiment, components a-i), a-ii) and a-iii) are introduced into a reactor and reacted under anhydrous conditions at a temperature of 50 to 150° C., preferably 50 to 11° C. The mixture is then cooled and standard industrial acetone and the short-chain diol iv) of a molecular weight of 62–400 and optionally the monofunctional alcohol v) are added and the mixture heated until the NCO content thereof has fallen to 65 to 85% of the theoretical value. The NCO prepolymer is produced in this manner.

The prepolymer mixture is then diluted with further acetone and combined with the calculated quantity of a mixture of diamine and chain terminator (dissolved in water). In this manner, up to 90% of the remaining NCO groups are reacted with the chain extender, the diamine and the chain terminator. The remaining isocyanate groups are then allowed to react with the water present to form the polyurethane-urea according to the invention.

While the polymer synthesis reaction is preferably performed without using catalysts, it is also possible to use known polyurethane catalysts (e.g. tertiary amines such as triethylamine, tin compounds such as tin(II) octoate, dibutyltin dilaurate and other commonly used catalysts).

Once NCO is no longer detectable (IR monitoring), the calculated quantity of neutralizing agents, preferably an ammonia solution, is added to the mixture such that 50 to 60% of the carboxyl groups present are neutralized by the ammonia.

The desired solids concentration is obtained by the addition of water and subsequent removal of acetone by distillation. Polyurethane-urea dispersions obtained using the process according to the invention have a solids content of 20 to 60 wt. %, preferably 30 to 40 wt. %, in water. The average particle diameter is 20 to 1000 nm, preferably 50 to 500 nm.

The pH values of the white, storage-stable polyurethane-urea dispersions according to the invention are from 6 to 9.

After physical drying at 20 to 100° C., preferably at 20 to 80° C., the polyurea dispersions according to the invention yield transparent, high gloss coatings, which are UV-resistant, temperature-resistant (−35 to 80° C.), resistant to precipitation (of an organic or inorganic nature), and which adhere well, but may also be removed by peeling. The tear strength and elongation of the coating layers are reasonably high.

The known additives from coating chemistry, such as pigments, light stabilizers, anti-settling agents, thickeners, surface-active compounds, defoamers, etc., may be used for formulating the coating compositions.

The coating compositions are applied using conventional coating technology methods by dipping, knife coating, pouring, spraying, atomization, brushing or roller application. They are used as a peelable coating for the temporary protection of motor vehicles, steel and aluminum profiles, glass and plastic sheets or articles. After the coating compositions have been applied the coated items are dried at room temperature or at an elevated temperature of up to 100° C.

If the polyurethaneurea dispersions according to the invention are dried for up to 30 minutes at 140–150° C., coatings are obtained which adhere strongly to the substrates. Drying temperatures of above 150° C. are, of course, also possible, but the use of such high temperatures is generally uneconomic.

Recycling of the used, peeled coating layers is very simple. The peeled coating layers, after optional prior cleaning, are mechanically comminuted, dissolved in acetone in a reaction vessel (optionally with heating), optionally filtered after dissolution, combined with the calculated quantity of neutralizing agent, preferably ammonia, diluted with water to the desired solids content of required polyurethane-urea dispersion and the acetone is removed by distillation, optionally under reduced pressure.

The invention is further illustrated but is not intended to be limited by the following examples in which all parts and percentages are by weight unless otherwise specified.

EXAMPLES

Example 1

170 g (0.1 moles) of a polyester, which was prepared from adipic acid as well as 1,6-hexanediol and neopentyl glycol (in a molar ratio of 0.65:0.35) and had a number average molecular weight of 1700 and a hydroxyl content of 2% were dehydrated in a reaction vessel for 30 minutes at 120° C. and 10 mbar with stirring. 13.4 g (0.1 moles) of dimethylolpropionic acid and 111 g (0.5 moles) of isophorone diisocyanate were then introduced under nitrogen. After a reaction time of 1 hour at 110° C., the mixture was cooled to 60° C. and dissolved in 100 g of acetone. After the addition of 18 g (0.2 moles) of 1,4-butanediol, stirring was continued for 22 hours at 50° C. until the NCO content was 1.60% (theoretical: 2.04%) and the mixture was then diluted with 500 g of acetone. A mixture containing 10.6 g (0.062 moles) of isophoronediamine, 1.07 g (0.016 moles) of a 25% ammonia solution and 60 g of water was added to the NCO prepolymer at 50° C. Stirring was then continued for 5 hours at 50° C. The mixture was neutralized with 3.4 g (0.05 moles) of a 25% ammonia solution and dispersed with 450 g of water. The acetone was removed at 50° C. and 150 mbar, resulting in a white dispersion having a solids content of 39.2% and an average particle size of 263 nm. The degree of neutralization was 50% and the salt content was 0.15 moles per kg of solids.

Example 2

Example 1 was repeated with the exception that ammonia was replaced by 3.56 g (0.04 moles) of dimethylethanolamine as the neutralizing agent. After acetone was removed, a white dispersion was obtained having a solids content of 35% and an average particle size of 309 nm. The degree of neutralization was 40% and the salt content was 0.12 moles per kg of solids.

Example 3

Example 1 was repeated with the exception that neutralization was performed with 4.08 g (0.06 moles) of a 25% ammonia solution and the polyurethane-urea mixture was dispersed with 680 g of water. After acetone was removed, a white dispersion was obtained having a solids content of 31.4% and an average particle size of 183 nm. The degree of neutralization was 60% and the salt content was 0.18 moles per kg of solids.

Example 4

245.1 g (0.125 moles) of a polyester, which was prepared from adipic acid as well as 1,2-ethanediol and 1,4-butanediol (in a molar ratio of 0.69:0.31) and had a number average molecular weight of 1961 and a hydroxyl group content of 1.73%, were dehydrated in a reaction vessel for 30 minutes at 120° C. and 10 mbar. 16.75 g (0.125 moles) of dimethylolpropionic acid and 131 g (0.5 moles) of dicyclohexylmethane 4,4'-diisocyanate were then introduced under nitrogen. After a reaction time of 1 hour at 110° C., the mixture was cooled to 80° C. and dissolved in 250 g of 2-butanone. After the addition of 11.25 g (0.125 moles) of 1,4-butanediol, stirring was continued for 12 hours at 80° C. until the NCO content was 1.28% (theoretical: 1.60%) and then the mixture was diluted with 500 g of acetone at 50° C. A mixture containing 17 g (0.1 moles) of isophoronediamine, 1.7 g (0.025 moles) of a 25% ammonia solution and 100 g of water was added to the NCO prepolymer at 50° C. Stirring was then continued for 1 hour at 50° C. The mixture was neutralized with 4.45 g (0.05 moles) of dimethylethanolamine and dispersed with 530 g of water. After the organic solvents were removed at 50° C. and 100 mbar, a white dispersion was obtained having a solids content of 38.7% and an average particle size of 480 nm. The degree of neutralization was 40% and the salt content was 0.12 moles per kg of solids.

Example 5

170 g (0.1 moles) of the polyester from Example 1 were dehydrated in a reaction vessel for 30 minutes at 120° C. and 10 mbar with stirring. 13.4 g (0.1 moles) of dimethylolpropionic acid and 111 g (0.5 moles) of isophorone diisocyanate were then introduced under nitrogen. After a reaction time of 1 hour at 110° C., the mixture was cooled to 60° C. and dissolved in 100 g of acetone. After the addition of 18 g (0.2 moles) of 1,4-butanediol, stirring was continued for 21 hours at 50° C. until the NCO content was 1.62% (theoretical: 2.04%) and then the mixture was diluted with 500 g of acetone. A mixture containing 1.09 g (0.016 moles) of a 25% ammonia solution and 60 g of water was added to the NCO prepolymer at 50° C. and stirring was continued for 21 hours at 50° C. The mixture was neutralized with 3.4 g (0.05 moles) of 25% ammonia solution and dispersed with 450 g of water. After the acetone was removed at 50° C. and 150 mbar, a white dispersion was obtained having a solids content of 39.8% and an average particle size of 210 nm.

The degree of neutralisation was 50% and the salt content was 0.16 moles per kg of solids.

Example 6
Use of the Aqueous Anionic Polyurethane Dispersion to Prepare a Coating 99.5 g of the product of Example 1 were homogeneously stirred together with 0.5 g of a substrate-wetting, flow promoting additive (ByK 346 Left from ByK-Chemie GmbH, Wesel) and diluted with distilled water to a drain time of 30 seconds in a DIN 4 mm cup at 23° C.

Example 7
Use of the Aqueous Anionic Polyurethane Dispersion to Prepare a Coating 99.5 g of the product of Example 2 were homogeneously stirred together with 0.5 g of a substrate-wetting, flow promoting additive (ByK 346 Lft from ByK-Chemie GmbH, Wesel) and diluted with distilled water to a drain time of 30 seconds in a DIN 4 mm cup at 23° C.

Application of Peelable Coating Dispersions

The peelable coating dispersions from Examples 6 and 7 were sprayed using a conventional coating gun having a 1.5 mm diameter nozzle and an atomizing pressure of 3 bar onto various test substrates, such as metal sheets precoated with known two-component PUR clear coats from the automotive industry to a wet film thickness of 160 to 300 μm at a relative humidity of 50 to 65% at approx. 23° C.

Drying

The wet films were flashed off at a relative humidity of 50 to 65% and about 23° C. for about 5 minutes and then dried for 10 minutes at 80° C. in a fresh air oven. This resulted in a dry film of 50 to 70 μm.

Coating properties from Examples 6 and 7

| | Example 6 | Example 7 |
| --- | --- | --- |
| Xenotest, Heraeus DIN 53231, method D (17:3, helical path) | >250 hours resistant | >250 hours resistant |
| Condensing moisture test DIN 50017 KK | >250 hours resistant | >240 hours resistant |
| MB chemicals test 30 minutes 36–75° C. | Examples 6 and 7 | |
| Tree resin | | No damage after 1 hour on the (automotive) coating at 75° C. |
| Pancreatin | | No damage after 1 hour on the (automotive) coating at 75° C. |
| 1% sulphuric acid | | No damage after 1 hour on the (automotive) coating at 58° C. |

-continued

| | Example 6 | Example 7 |
| --- | --- | --- |
| FAM test (10 minutes of exposure to gasoline followed by dabbing with Cotton wool) | | No damage after 1 hour on the (automotive) coating |

Example 8
(Recycling)

The salt content of a peelable coating film produced from the aqueous polyurethane-urea dispersion of Example 2 was determined titrimetrically. The value found was 0.11 moles/kg of film. After dissolving 130 g of film in 300 g of acetone and adding 0.36 g of dimethyl-etlianolamine, the mixture was dispersed with 300 g of water. After the acetone was removed, the dispersion had a solids content of 31.2% and a degree of neutralization of 46%. The salt content was 0.14 moles/kg of solid resin and the average particle size was 160 nm. A 200 μm film applied by knife coating and dried at 80° C. was clear, glossy and defect-free and, like the original film, may readily be peeled off.

Comparative Examples 170 g (0.1 mol) of the polyester of Example 1 were dehydrated in a reaction vessel for 30 minutes at 120° C. and 10 mbars, with stirring. 13.4 g (0.1 mol) of dimethylolpropionic acid and 111 g (0.5 mol) of isophorone diisocyanate were introduced under nitrogen. After a reaction time of 1 hour at 110° C. the mixture was cooled to 60° C. and dissolved in 100 g of acetone. After adding 18 g (0.2 mol) of 1,4-butanediol the mixture was stirred for a further 6 hours at 50° C. until the NCO content was 1.95% (theoretical: 2.04%) and diluted with 500 g of acetone. A mixture of 10.6 g (0.062 mol) of isophorone diamine, 1.07 g (0.016 mol) of a 25% ammonia solution and 60 g of water was added to the NCO prepolymer at 50° C. Then the mixture was subsequently stirred for 5 hours at 50° C., neutralised with 3.4 g (0.05 mol) of a 25% ammonia solution and dispersed with 450 g of water.

The acetone was removed at 50° C. and 150 mbars, whereupon a coarsely divided dispersion was obtained which settled on being stored.

The test was repeated, except that the NCO content for the NCO prepolymer was 1.98% of NCO and the neutralisation was carried out with 4.08 g (0.06 mol) of a 25% ammonia solution. The dispersion obtained in this manner was finely divided and did not settle.

Films produced from this dispersion which were dried at room temperature and 80° C. displayed cracks and were not homogeneous.

In additional examples (composition as in Example 1 and the Comparative Example) it was found that at NCO values which were only slightly below the calculated NCO content of 2.04%, reproducibility was no longer obtainable.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for recycling a peelable polyurethane coating which comprises

I) comminuting the peeled coating, optionally after prior cleaning,

II) dissolving the product of step 1) in an inert solvent having a boiling range of 50 to 100° C., water and neutralizing agent, optionally with heating, III) removing the organic solvent by distillation, optionally under reduced pressure, and IV) recovering the recycled coating composition for reuse in the form of an aqueous dispersion.

2. The process of claim 1 wherein the polyurethane coating is prepared from a solvent-free, aqueous, anionic dispersion of polyurethane-ureas, the solids content of which comprises the reaction product, present at least partially in salt form, of a) an NCO prepolymer prepared from
  i) 20 to 60 wt. % of an aliphatic and/or cycloaliphatic diisocyanate,
  ii) 20 to 80 wt. % of a diol having a number average molecular weight of 500 to 10,000,
  iii) 2 to 12 wt. % of a 2,2-bis-(hydroxymethyl)alkane monocarboxylic acid,
  iv) 0 to 15 wt. % of a diol having a molecular weight of 62 to 400, and
  v) 0 to 10 wt. % of a monofunctional alcohol as a chain terminating agent having a molecular weight of 32 to 350, with b) 0 to 15 wt. % of a diamine having a molecular weight in the range from 60 to 300 as a chain extender, c) 0 to 10 wt. % of a chain terminating agent comprising a member selected from the group consisting of monoamines, alkanolamines and ammonia, d) 0 to 3 wt. % of water and e) 0.1 to 10 wt. % of a neutralizing agent, wherein the sum of the preceding percentages is 100%, provided that the actual NCO content of prepolymer a) is 65 to 85% of the theoretical NCO content.

3. The process of claim 2 wherein component iii) comprises 2,2-dimethylol propionic acid.

4. The process of claim 2 wherein the actual NCO content of prepolymer
a) is 75 to 80% of the theoretical NCO content.

5. The process of claim 3 wherein the actual NCO content of prepolymer
a) is 75 to 80% of the theoretical NCO content.

* * * * *